United States Patent
Lee

(10) Patent No.: US 11,177,758 B2
(45) Date of Patent: Nov. 16, 2021

(54) APPARATUS AND METHOD FOR CONTROLLING SWITCHING OF HIGH SPEED WIRING MODE OF A MOTOR

(71) Applicant: LG ELECTRONICS INC., Seoul (KR)

(72) Inventor: Yonghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 16/661,844

(22) Filed: Oct. 23, 2019

(65) Prior Publication Data
US 2020/0403549 A1   Dec. 24, 2020

(30) Foreign Application Priority Data
Jun. 20, 2019   (KR) .................. 10-2019-0073643

(51) Int. Cl.
*H02P 21/24* (2016.01)
*H02P 27/08* (2006.01)
(Continued)

(52) U.S. Cl.
CPC ............ *H02P 27/085* (2013.01); *F24F 11/46* (2018.01); *F24F 11/86* (2018.01); *H02P 23/14* (2013.01);
(Continued)

(58) Field of Classification Search
CPC ... F24F 11/46; F24F 11/86; H02P 1/32; H02P 25/184; H02P 27/045; H02P 27/085
See application file for complete search history.

(56) References Cited

U.S. PATENT DOCUMENTS

2004/0217723 A1   11/2004   Cai et al.
2010/0264862 A1*  10/2010   Kitagawa .................. H02P 6/15
                                                        318/400.13
(Continued)

FOREIGN PATENT DOCUMENTS

JP   4619826 B2   1/2011
JP   4722069 B2   7/2011
(Continued)

*Primary Examiner* — Muhammad S Islam
(74) *Attorney, Agent, or Firm* — Dentons US LLP

(57) ABSTRACT

The present disclosure relates to an apparatus and method for controlling switching of a wiring mode of a motor capable of being operated in a plurality of wiring modes, a motor control apparatus includes a motor including a rotor that rotates according to a motor torque by a pulse width modulation (PWM) control, a switching unit provided at the motor and switching a wiring method inside the motor so that the motor is driven according to another wiring mode, and a controller generating a speed command frequency for controlling a rotation speed of the rotor, and controlling the switching unit so that the wiring mode of the motor is switched according to a result of comparing the speed command frequency with a switching boundary frequency according to the wiring mode of the motor, wherein when the PWM control is stopped in response to the switching of the wiring mode, the controller estimates a rotation state of the rotor that rotates inertially, and when the PWM control is restarted, the controller sets the estimated rotation state of the rotor as an initial value of the rotor, and controls a rotation speed of the motor of which the wiring mode is switched based on the set initial value of the rotor.

20 Claims, 10 Drawing Sheets

(51) Int. Cl.
  *F24F 11/86*   (2018.01)
  *F24F 11/46*   (2018.01)
  *H02P 23/14*   (2006.01)
  *H02P 25/18*   (2006.01)
  *H02P 27/04*   (2016.01)

(52) U.S. Cl.
  CPC .......... *H02P 25/184* (2013.01); *H02P 27/045* (2013.01)

(56) References Cited

U.S. PATENT DOCUMENTS

| | | | |
|---|---|---|---|
| 2013/0057193 A1* | 3/2013 | Iwaji | H02P 6/185 318/721 |
| 2016/0285397 A1 | 9/2016 | Feng et al. | |
| 2017/0194889 A1* | 7/2017 | Iwaji | H02P 6/20 |
| 2017/0264217 A1* | 9/2017 | Bachman | H02P 1/028 |

FOREIGN PATENT DOCUMENTS

| | | |
|---|---|---|
| KR | 10-2006-0011714 A | 2/2006 |
| KR | 10-2017-0030260 A | 3/2017 |
| WO | 2019/026125 A1 | 2/2019 |
| WO | 2019/026282 A1 | 2/2019 |

\* cited by examiner

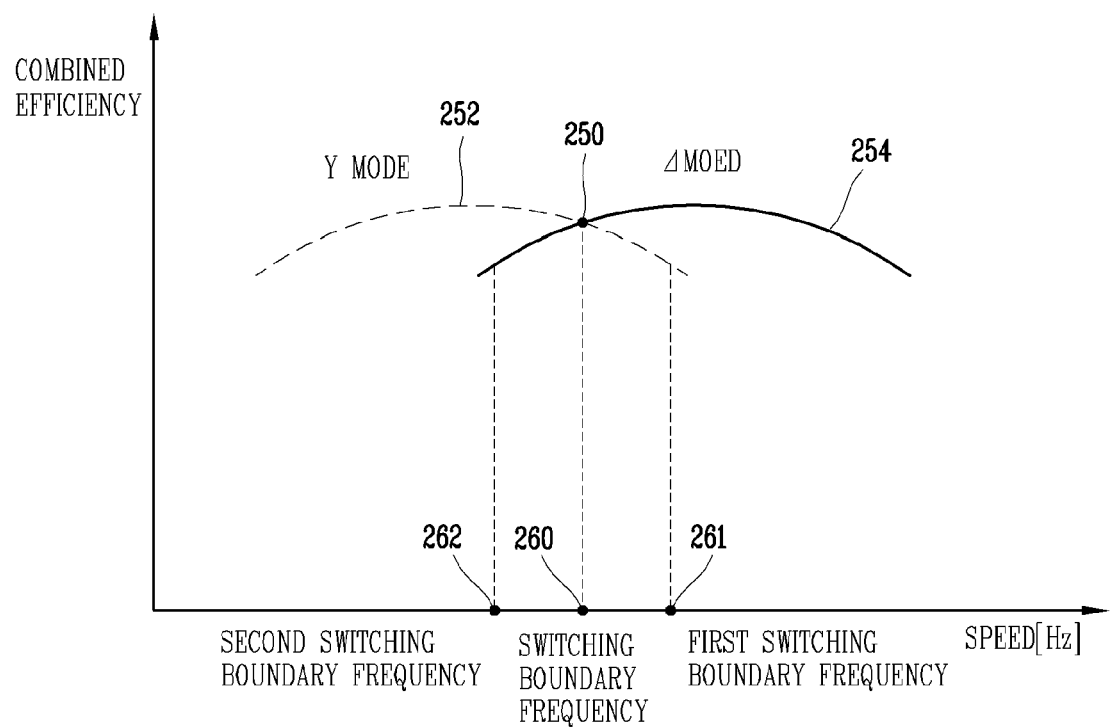

(a)

(b)

(a)

(b)

(a)

(b)

APPARATUS AND METHOD FOR CONTROLLING SWITCHING OF HIGH SPEED WIRING MODE OF A MOTOR

CROSS-REFERENCE TO RELATED APPLICATION

Pursuant to 35 U.S.C. § 119(a), this application claims the benefit of earlier filing date and right of priority to Korean Patent Application No. 10-2019-0073643, filed on Jun. 20, 2019, the contents of which is incorporated by reference herein in its entirety.

BACKGROUND OF THE INVENTION

1. Field of the Invention

The present disclosure relates to a motor capable of being operated in a plurality of wiring modes, and to an apparatus and method for controlling switching of the wiring mode of the motor.

2. Background of the Invention

Generally, a motor for driving is used in a compressor of an air conditioner or the like. The motor used in such an air conditioner compressor or the like may be designed to be operated in a general Y (Wye) wiring method or in a Δ (Delta) wiring method. In this case, since the Δ wiring method may make an output voltage of an inverter to be higher, there is an advantage that high-speed operation may be performed more efficiently than when the Y-wiring method is operated. Accordingly, the motor used in the air conditioner compressor or the like may be designed so that both the Y wiring method and the Δ wiring method may be used.

Meanwhile, according to the prior art JP4619826b2, when switching of a wiring method of a compressor motor uses a relay switch to cut off a current input and an output of an inverter for a torque of the motor (pulse width modulation (PWM) control stop), and when the motor is stopped by cutting off of the input current of torque and the output of the inverter, switching of wiring is performed by switching a relay, and the switching of the wiring of the motor is performed by controlling the stopped motor according to the switched wiring method.

However, generally, even when the input current of the torque and the output of the inverter are cut off, a rotor of a motor rotates until a moment of inertia becomes smaller than a load torque. Accordingly, there are problems that it takes a predetermined time for the motor to rotate by inertia until the motor stops, and the time required for the switching of the wiring of the motor becomes long.

Meanwhile, as described above, the compressor motor is for driving the compressor of the air conditioner, and when a torque of the compressor motor decreases, a pressure applied to the compressor may be lost. Meanwhile, when the switching of the wiring is performed after the driving of the motor is stopped, since the motor is driven again according to the switched wiring mode, and the motor is driven until a designated pressure is applied to the compressor, the more the pressure is lost, the more the amount of power is consumed by the air conditioner compressor, and thus efficiency of the air conditioner is lowered.

Therefore, when the wiring of the motor is switched by the method disclosed in the related art JP4619826b2, as the time required until the driving of the motor is stopped becomes longer the pressure applied to the compressor may be lost for a longer time. In this case, when the switching of the wiring of the motor is completed, there is a problem that efficiency of the air conditioner is lowered because the motor should be further driven by the lost pressure.

SUMMARY OF THE INVENTION

The present disclosure provides a motor control apparatus capable of switching a wiring mode of a motor at a higher speed, and a control method thereof.

The present disclosure provides a motor control apparatus capable of preventing a deterioration in efficiency of an air conditioner compressor according to the switching of the wiring mode of the motor by minimizing a pressure of a compressor lost during the switching of the wiring mode of the motor, and a control method thereof.

According to an aspect of the present disclosure to achieve the above or another object, when a wiring mode of a motor is switched from a first mode to a second mode according to a speed command frequency of the motor, in the present disclosure, it is possible to calculate a position and speed of a motor rotor rotating according to inertia when an output of an inverter is stopped, and to set as an initial value for controlling the motor according to the second mode based on the calculated position and rotation speed of the rotor. Accordingly, in the present disclosure, it is possible to reduce a time required for the switching of the wiring of the motor, and to reduce the compressor pressure lost during the switching of the wiring of the motor by allowing the rotation of the motor to be controlled according to the second mode before the rotation of the motor is stopped. Accordingly, efficiency of an air conditioner may be further increased.

For this, a motor control apparatus according to an embodiment of the present disclosure includes a motor including a rotor that rotates according to a motor torque by a pulse width modulation (PWM) control, a switching unit provided at the motor and switching a wiring method inside the motor so that the motor is driven according to another wiring mode, and a controller generating a speed command frequency for controlling a rotation speed of the rotor, and controlling the switching unit so that the wiring mode of the motor is switched according to a result of comparing the speed command frequency with a switching boundary frequency according to the wiring mode of the motor, wherein when the PWM control is stopped in response to the switching of the wiring mode, the controller estimates a rotation state of the rotor that rotates inertially, and when the PWM control is restarted, the controller sets the estimated rotation state of the rotor as an initial value of the rotor, and controls a rotation speed of the motor of which the wiring mode is switched based on the set initial value of the rotor.

In one embodiment, when the PWM control is restarted, the controller reflects a phase difference according to the other wiring mode and compensates a position of the rotor.

In one embodiment, the position of the rotor to be compensated is +30 degrees or −30 degrees.

In one embodiment, when the initial value of the rotor is set, the controller controls the rotation speed of the motor of which the wiring mode is switched according to the speed command frequency after maintaining the rotation state of the rotor according to the set initial value of the rotor for a predetermined time.

In one embodiment, when the PWM control is stopped according to the switching of the wiring mode, the controller generates an inertial rotation model of the rotor, and estimates a rotation state of the rotor based on an angular velocity calculated based on the inertial rotation model and a time elapsed after the PWM control is stopped.

In one embodiment, the controller applies a zero voltage vector to an inverter applying alternating current (AC) to the motor, and estimates a rotation state of the rotor during inertial rotation based on a difference in current induced in the rotor.

In one embodiment, the controller estimates at least one of the rotation speed of the rotor in an inertia rotation state and the position of a specific pole of the rotor according to the PWM control stop as the rotation state of the rotor.

In one embodiment, when the motor is a synchronous motor in which a rotation magnetic field and a rotation of the rotor are synchronized, the controller synchronizes the rotation magnetic field and the rotation of the rotor based on the estimated position of the specific pole of the rotor.

In one embodiment, the motor is driven in a Y wiring mode or Δ wiring mode depending on the wiring method, when a present wiring mode of the motor is the Y wiring mode, the controller switches to the Δ wiring mode when the speed command frequency is higher than a first switching boundary frequency, and when the present wiring mode of the motor is the Δ wiring mode, the controller switches to the Y wiring mode when the speed command frequency is lower than a second switching boundary frequency.

In one embodiment, the first switching boundary frequency and the second switching boundary frequency may be the same speed command frequency as each other.

In one embodiment, when the switching to the Δ wiring mode is performed, the controller controls the motor such that the rotor accelerates by a difference between the rotation speed according to the speed command frequency and the rotation speed of the rotor according to the initial value, and when the switching to the Y wiring mode is performed, the controller controls the motor such that the rotor decelerates by a difference between the rotation speed according to the speed command frequency and the rotation speed of the rotor according to the initial value.

In one embodiment, the switching boundary frequency is a speed command frequency corresponding to the rotation speed of the rotor when first combined efficiency determined depending on efficiency of the motor according to a first wiring mode and second combined efficiency determined depending on efficiency of the motor according to a second wiring mode are the same.

In one embodiment, the controller may generate a hysteresis bandwidth around the switching boundary frequency, and switch the wiring mode of the motor when the changed speed command frequency deviates from the hysteresis bandwidth.

In one embodiment, when the changed speed command frequency exceeds 110% of the switching boundary frequency, the controller switches the wiring mode of the motor from the first wiring mode to the second wiring mode, and when the changed speed command frequency is less than 90% of the switching boundary frequency, the controller switches the wiring mode of the motor from the second wiring mode to the first wiring mode.

In one embodiment, the controller estimates a rotation state of the rotor that rotates inertially based on an inertial rotation state modeled according to following Equation 3.

$$T_e - T_L = J_m \frac{d\omega_{rm}}{dt} + B_m \omega_{rm} \rightarrow d\omega_{rm} = -T_L/J_m \ dt \quad \text{[Equation 3]}$$

where, $T_e$ refers to an electric torque and a magnitude of a torque induced in a rotor, $T_L$ refers to a magnitude of a load torque, $T_D$ refers to a difference between the electric torque and the load torque, $J_m$ refers to inertia of the rotor, S refers to a Laplace constant, $B_m$ refers to a friction coefficient, and $\omega_{rm}$ refers to a rotor angular velocity.

According to an aspect of the present disclosure to achieve the above or another object, a control method of a compressor motor according to an embodiment of the present disclosure includes, a first step of detecting a wiring mode according to a wiring method of the motor when a speed command frequency for controlling a rotation speed of a rotor of the motor is changed, a second step of comparing a predetermined switching boundary frequency according to the wiring mode with the changed speed command frequency, a third step of stopping pulse width modulation (PWM) control according to the comparison result and switching the wiring mode of the motor, a fourth step of estimating the rotation speed of the rotor while the PWM control is stopped, a fifth step of setting an initial value of the rotor based on the estimated rotation speed when the PWM control is restarted, and a sixth step of controlling rotation of the motor of which the wiring mode is switched according to the predetermined initial value and a rotation speed difference according to the changed speed command frequency.

In one embodiment, the fifth step may further include a fifth-first step of reflecting a phase difference according to the wiring mode of the switched motor and compensating for a position of the rotor when the PWM control is restarted.

In one embodiment, the position of the rotor to be compensated is +30 degrees or −30 degrees.

In one embodiment, the fourth step may further include a fourth-first step of estimating a position of a specific pole of the rotor.

In one embodiment, the switching boundary frequency is a speed command frequency corresponding to the rotation speed of the rotor when first combined efficiency determined depending on efficiency of the motor according to the first wiring mode and second combined efficiency determined depending on efficiency of the motor according to the second wiring mode are the same.

BRIEF DESCRIPTION OF THE DRAWINGS

FIG. 2B is an illustrative view for illustrating an example of a switching boundary frequency determined according to combined efficiency of a Y wiring mode motor and combined I efficiency of a Δ wiring mode motor.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. Therefore, it should be considered broadly within its scope as defined in the appended claims.

Figure 1:
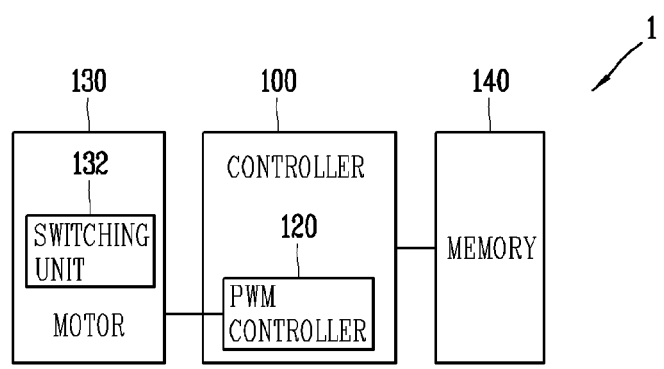
FIG. 1 is a block diagram illustrating a configuration of a compressor motor control apparatus according to an embodiment of the present disclosure.

FIG. 1 is a block diagram illustrating a configuration of a compressor motor control apparatus 1 according to an embodiment of the present disclosure.

Referring to FIG. 1, the compressor motor control apparatus 1 according to an embodiment of the present disclosure includes a controller 100, a motor 130 connected to the controller 100 and controlled by the controller 100, and a memory.

First, the motor 130 may be provided with a rotor and a stator, and driven by rotating the rotor according to a motor torque according to an AC applied via an inverter (not provided). The motor 130 may include a synchronous motor that operates in synchronization with a phase to an AC having a sign wave shape, and an asynchronous motor that operates in a state that is not synchronized with a phase. Here, in the case of the synchronous motor, the synchronous motor may refer to a motor in which the rotor of the motor 130 is rotated in synchronization with rotation of a rotation magnetic field and the asynchronous motor may refer to a motor in which the rotor of the motor 130 is not synchronized with the rotation of the rotation magnetic field.

In addition, the motor 130 may be formed to use both a Y (Wye) wiring method and a Δ (Delta) wiring method by differentiating the internal wiring method. In addition, the motor 130 may be a motor formed to switch the wiring mode during an operation, and may include a switching unit 132 for switching the wiring mode of the motor 130.

The switching unit 132 may include at least one switch for selectively connecting windings according to different wiring modes, and the windings according to a specific wiring mode are connected to each other according to the control of the controller 100, so that the motor 130 may be driven in any one of an operation mode according to the Y (Wye) wiring method (hereinafter referred to as a Y wiring mode) and an operation mode according to the Δ (Delta) wiring method (hereinafter referred to as a Δ wiring mode). Meanwhile, when the switching of the wiring mode is made, since the at least one switch is switched from the winding according to the wiring mode before switching to the winding according to the wiring mode after switching, the output of the inverter and the motor torque may be cut off according to the switching. Hereinafter, the wiring mode before switching will be referred to as a 'first wiring mode', and the wiring mode after switching will be referred to as a 'second wiring mode'.

The controller 100 may control the overall operation of the compressor driving motor 130 according to an embodiment of the present disclosure. For example, the controller 100 may generate a speed control signal for controlling the compressor driving motor 130 according to a function of an air conditioner or a set target temperature. In this case, the controller 100 may control the motor 130 in a pulse width modulation (PWM) manner. For this, the controller 100 may include a PWM controller 120.

The PWM controller 120 controls the switches provided at the inverter (not shown), so that a direct current (DC) may be converted into an AC via the inverter. The PWM controller 120 may control the rotation speed of the motor 130 by controlling the switches of the inverter according to the speed control signal to generate an AC to be applied to the motor 130.

Meanwhile, the speed control signal of the motor may be generated in a form of a speed command frequency. Therefore, when the controller 100 generates a speed command frequency for controlling the rotation speed of the motor 130 as the speed control signal according to the set function of the air conditioner or the set target temperature, the PWM controller 120 may control the inverter such that an AC according to the speed command frequency is generated. Then, the AC according to the speed command frequency is applied to the motor 130 by the inverter, so that the rotation speed of the rotor of the motor 130 may be changed according to the speed command frequency.

Meanwhile, the controller 100 of the compressor motor control apparatus 1 according to an embodiment of the present disclosure may switch the wiring mode of the motor 130 based on the speed command frequency automatically. For this, when the speed command frequency is changed, the controller 100 may detect a present wiring mode of the motor 130 and compare the switching boundary frequency according to the detected wiring mode with the changed speed command frequency. In addition, the switching unit 132 may be controlled such that the wiring mode of the motor 130 is switched according to a comparison result.

Meanwhile, when the output of the inverter and the motor torque are cut off as the wiring mode of the motor 130 is switched, the rotor of the motor 130 may be inertially rotated for a predetermined time until the moment of inertia becomes smaller than a load torque. As described above, when the rotor of the motor 130 rotates inertially, the controller 100 may detect a state in which the rotor rotates inertially. Here, the rotation state of the motor 130 may include different values detected from the inertially rotating rotor. As an example, the rotation state of the rotor may include a rotation speed of an inertially rotating rotor, or may include a position of a specific pole (for example, N pole) of the inertially rotating rotor.

Meanwhile, when the state of the rotor in the inertial rotation is detected, the controller 100 may set an initial value of the rotor according to the detected state of the rotor. As an example, when the motor 130 is an asynchronous motor, the controller 100 may set the detected rotation speed of the rotor as the initial value. On the other hand, when the motor 130 is a synchronous motor, the controller 100 may set not only the rotation speed of the rotor but also the position of a specific pole of the rotor as an initial value.

In addition, the controller 100 may control the speed of the motor 130 according to the second wiring mode based on the detected initial value. For example, the controller 100 may control the motor 130 such that the rotation of the rotation magnetic field is synchronized with the rotation of the rotor based on the position of a specific pole included in the detected initial value of the rotor. Further, the controller 100 may control the rotation speed of the motor 130, that is, the rotation speed of the rotor, such that a speed according to the speed command frequency is reached based on the rotation speed included in the detected initial value of the rotor. Accordingly, when the wiring mode of the motor 130 is switched, the motor control according to the second wiring mode is performed with the rotation state of the rotor in the inertial rotation as an initial value, so that the switching of a wiring mode may be performed at a higher speed, and thus the compressor motor control apparatus 1 according to an embodiment of the present disclosure can minimize the lost pressure of the compressor due to the switching.

Meanwhile, the memory 140 stores data supporting the functions of the controller 100. The memory 140 may store information according to the present wiring mode of the motor 130, and data and commands for controlling the motor 130 at the controller 100 according to the present wiring mode. Furthermore, the memory 140 may store data or commands for detecting a rotation state of the rotor in the inertial rotation.

Figure 2A:
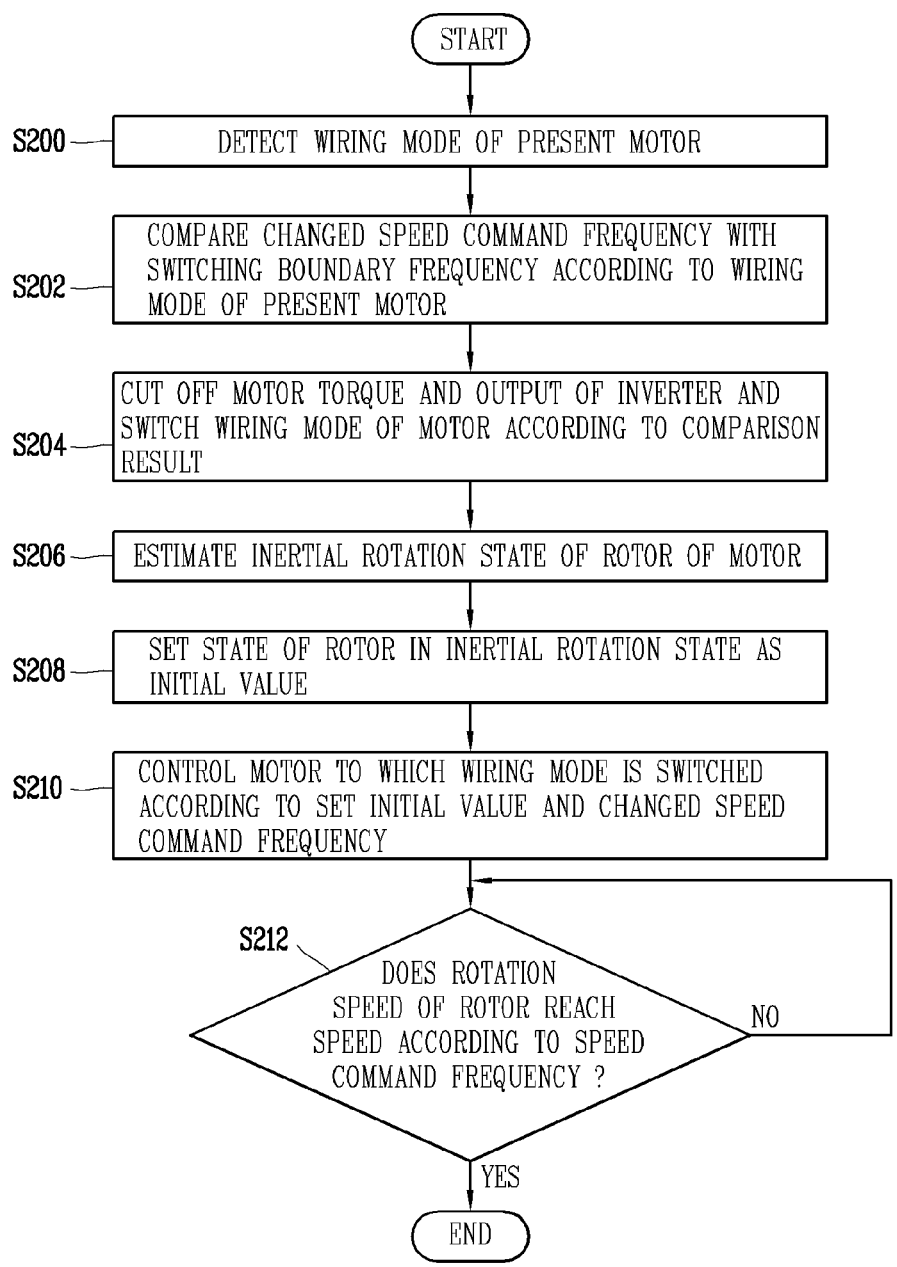
FIG. 2A is a flowchart illustrating an operation process of a compressor motor control apparatus according to an embodiment of the present disclosure.

FIG. 2A is a flowchart illustrating an operation process of a compressor motor control apparatus 1 according to an embodiment of the present disclosure.

Referring to FIG. 2A, the controller 100 of the compressor motor control apparatus 1 according to an embodiment of the present disclosure may generate a speed control signal that is, a speed command frequency for controlling the compressor driving motor 130 at the timing of driving an air conditioner. The compressor driving motor 130 may be controlled by applying an AC according to the generated speed command frequency to the compressor driving motor 130.

In such a state, the controller 100 may detect whether a change of the speed command frequency has occurred. As an example, the controller 100 may generate a speed command frequency for differently controlling the compressor driving motor 130 by changing a function set to an air conditioner or changing a set target temperature. In this case, the generated speed command frequency may vary, and the controller 100 may determine that the speed command frequency is changed.

As described above, when the present other speed command frequency is generated, that is, when the speed command frequency is changed, the controller 100 may detect the present wiring mode of the motor 130 (S200). In addition, the switching boundary frequency according to the detected wiring mode and the currently applied speed command frequency, that is, the changed speed command frequency may be compared with each other (S202).

Here, the switching boundary frequency may refer to a boundary frequency for switching the wiring mode of the motor 130. The switching boundary frequency may refer to a frequency at which efficiency is lowered (for example, consumes more current) than that of operating in the L wiring mode when the rotation speed of the motor is faster in the Y wiring mode, which is usually suitable for low speed operation. Alternatively, the switching boundary frequency may refer to a frequency at which efficiency is lowered (for example, consumes more current) than that of operating in the Y wiring mode when the rotation speed of the motor is slower in the Δ wiring mode which is usually suitable for operation at a high speed.

That is, the switching boundary frequency may refer to a limitation of a rotation speed of the motor 130 which may maintain a minimum efficiency when the motor 130 is driven according to the currently set wiring mode, compared with when the motor 130 is driven according to another wiring mode. Such a switching boundary frequency may be set with respect to the Y wiring mode and the Δ wiring mode, respectively. In this case, of course, the switching boundary frequency set with respect to the each wiring mode may be the same.

Meanwhile, the switching boundary frequency may be determined according to the efficiency of the power converter, that is, the efficiency of the inverter (PWM controller 120) and the efficiency of the wiring mode of each motor. FIG. 2B illustrates an example of switching boundary frequencies determined according to combined efficiency of a Y wiring mode motor and combined efficiency of a Δ wiring mode motor.

Referring to FIG. 2B, first, examples of a combined efficiency 252 of the Y wiring mode motor and a combined efficiency 254 of the Δ wiring mode motor are shown. Here, the combined efficiency may be an efficiency including the efficiency of the inverter and the efficiency of the motor of each wiring mode, and may be calculated as shown in Equation 1 below.

$$\begin{aligned}&Y \text{ wiring mode motor combined efficiency=inverter}\\&\quad\text{efficiency}\times Y\text{ wiring mode motor efficiency}\\\\&\Delta \text{ wiring mode motor combined efficiency=inverter}\\&\quad\text{efficiency}\times\Delta\text{ wiring mode motor efficiency}\end{aligned}\quad\text{[Equation 1]}$$

Meanwhile, as shown in FIG. 2B, the speed command frequency corresponding to the speed at the point corresponding to a point 250 at which the combined efficiency 252 of the Y wiring mode motor and the combined efficiency 254 of the Δ wiring mode motor overlap may be set as a switching boundary frequency 260.

Meanwhile, when the rotation speed of the motor 130 is higher than the switching boundary frequency 260, the controller 100 may switch the wiring mode of the motor 130 to the Δ wiring mode. On the other hand, when the rotation speed of the motor 130 is lower than the switching boundary frequency 260, the controller 100 may switch the wiring mode of the motor 130 to the Y wiring mode.

Meanwhile, as shown in FIG. 2B, when the switching boundary frequency is set as a specific frequency, the switching of the wiring mode of the motor 130 may be generated excessively according to the change of the speed command frequency. Accordingly, the present disclosure may have a hysteresis bandwidth around the switching boundary frequency, and despite deviating from the switching boundary frequency, maintain the present wiring mode as long as not deviating from the hysteresis bandwidth.

Meanwhile, the hysteresis bandwidth may be determined based on the switching boundary frequency. As an example, the hysteresis bandwidth may be determined to be about 10% around the switching boundary frequency. In this case, when the speed command frequency exceeds 110% 261 of the switching boundary frequency 260, the controller 100 may switch the wiring mode of the motor 130 from the Y wiring mode to the Δ wiring mode. On the other hand, when the speed command frequency is less than 90% 262 of the switching boundary frequency 260, the wiring mode of the motor 130 may be switched from the Δ wiring mode to the Y wiring mode. In this case, the switching boundary frequency of each wiring mode may be different. In the following description, it is assumed that different switching boundary frequencies are set with respect to each wiring mode.

In step S202, when the present wiring mode is the Y wiring mode, the controller 100 may determine whether the currently changed speed command frequency is greater than the first switching boundary frequency 261 corresponding to the Y wiring mode. In addition, when the changed speed command frequency is greater than the first switching boundary frequency 261, the controller 100 may determine that the switching of the wiring mode is required. Further, according to the determination result of step S202, the controller 100 may control the switching unit 132 to switch the wiring mode. In this case, the output of the inverter and the motor torque applied to the motor 130 may be cut off temporarily due to opening of a switch in the switching unit 132 (S204).

Meanwhile, in the step S202, when the present wiring mode is the Δ wiring mode not the Y wiring mode, the step S202 may be a process of determining whether the currently changed speed command frequency is smaller than the second switching boundary frequency 262 corresponding to the Δ wiring mode. When the changed speed command frequency is smaller than the second switching boundary frequency 262, the controller 100 may determine that the switching of the wiring mode is required. Further, according to the determination result of step S202, the controller 100 may control the switching unit 132 to switch the wiring mode. In this case, in the step S204, the output of the inverter and the motor torque applied to the motor 130 may be temporarily cut off due to the opening of the switch in the switching unit 132. Furthermore, the output of the inverter according to the wiring mode switched after a predetermined time may be applied to the motor 130 to generate a motor torque.

Meanwhile, when the output of the inverter applied to the motor 130 and the motor torque is cut off temporarily as the switching of the wiring mode is performed in the step S204, the rotor of the motor 130 may be in an inertial rotation state. Then, the controller 100 may estimate the rotation state of the rotor of the inertially rotating motor 130 during the switching time according to hardware characteristics of the switch of the switching unit 132 (S206).

The controller 100 may use various methods to estimate the inertial rotation state of the rotor in the step S206. As an example, when a zero voltage vector that makes an output voltage zero is applied, the controller 100 may use a method of estimating the speed of the rotor in the inertial rotation and the position of the specific pole by using a characteristic in which current induced in the rotor varies depending on the position of the rotor. Alternatively, the controller 100 may use a method of generating an inertial rotation model of the rotor and estimating the rotation speed of the rotor and the position of the specific pole of the rotor based on the generated inertial rotation model. Hereinafter, a method of estimating the rotation state of the rotor based on the method of using such an inertial rotation model will be described in more detail with reference to FIG. 3.

Meanwhile, when the rotation state of the rotor in the inertial rotation is estimated in the step S206, the controller 100 may set the initial value of the rotor based on the estimated state (S208). As an example, the estimated state of the rotor may include at least one of a rotation speed of the rotor and a position of a specific pole (for example, N pole). Therefore, the controller 100 may set at least one of the rotation speed of the rotor and the position of the N pole as an initial value in step S208.

In this case, when the motor 130 is an asynchronous motor that does not require synchronization of the rotation magnetic field and the rotor, the controller 100 may set only the rotation speed of the rotor as the initial value of the rotor. On the other hand, when the motor 130 is a synchronous motor, the controller 100 may set the rotation speed and the detected position of the N pole as the initial value of the rotor. This is because in the case of a synchronous motor, the rotation magnetic field is necessary to be synchronized with the rotor and for this, the rotation magnetic field may be synchronized according to the position of the N pole of the rotor.

When the initial value of the rotor is set in the step S208, the controller 100 may control the motor of which the wiring mode is switched to the second wiring mode based on the set initial value and the changed speed command frequency (S210). Accordingly, the output of the inverter according to the switched wiring mode is applied to the motor 130 to generate the motor torque again. That is, in the present disclosure, the output of the inverter (the output according to the switched wiring mode) may be applied to the motor 130 according to the rotation state of the rotor in the inertial rotation.

In the step S210, the controller 100 may allow the rotor to be further accelerated (at the timing of switching from Y wiring mode to Δ wiring mode) or further decelerated (at the timing of switching from Δ wiring mode to Y wiring mode)

based on a present rotation speed of the rotor and rotation speed of the motor 130 according to the speed command frequency.

That is, when the changed speed command frequency corresponds to a speed more than the speed corresponding to the first switching boundary frequency 261, the rotation speed of the motor 130 switched to the Δ wiring mode may be further accelerated such that the present rotation speed of the rotor reaches a speed corresponding to the changed speed command frequency.

On the other hand, that is, when the changed speed command frequency corresponds to a speed less than the speed corresponding to the second switching boundary frequency 262, the rotation speed of the motor 130 switched to the Y wiring mode may be further decelerated such that the present rotation speed of the rotor reaches a speed corresponding to the changed speed command frequency.

In this case, the controller 100 may control the motor 130 to further accelerate or further decelerate the rotor by a difference between the rotation speed of the motor 130 according to the speed command frequency and the rotation speed of the rotor set as an initial value.

In addition, the controller 100 may detect whether the rotation speed of the rotor reaches a speed corresponding to the changed speed command frequency. Further, when the rotation speed of the rotor reaches a speed corresponding to the changed speed command frequency, the process of switching the wiring mode of the rotor according to the changed speed command frequency may be terminated (S212).

Meanwhile, the process of setting the initial value of the rotor in the step S208 may further include maintaining a currently detected rotation state of the rotor for a predetermined time. This is to maintain the rotation speed according to the detected initial value of the rotor for the predetermined time to limit the occurrence of transient response output and to stabilize the rotation state of the rotor in the inertial rotation state with the rotation according to the output of the inverter and motor torque.

Figure 2C:
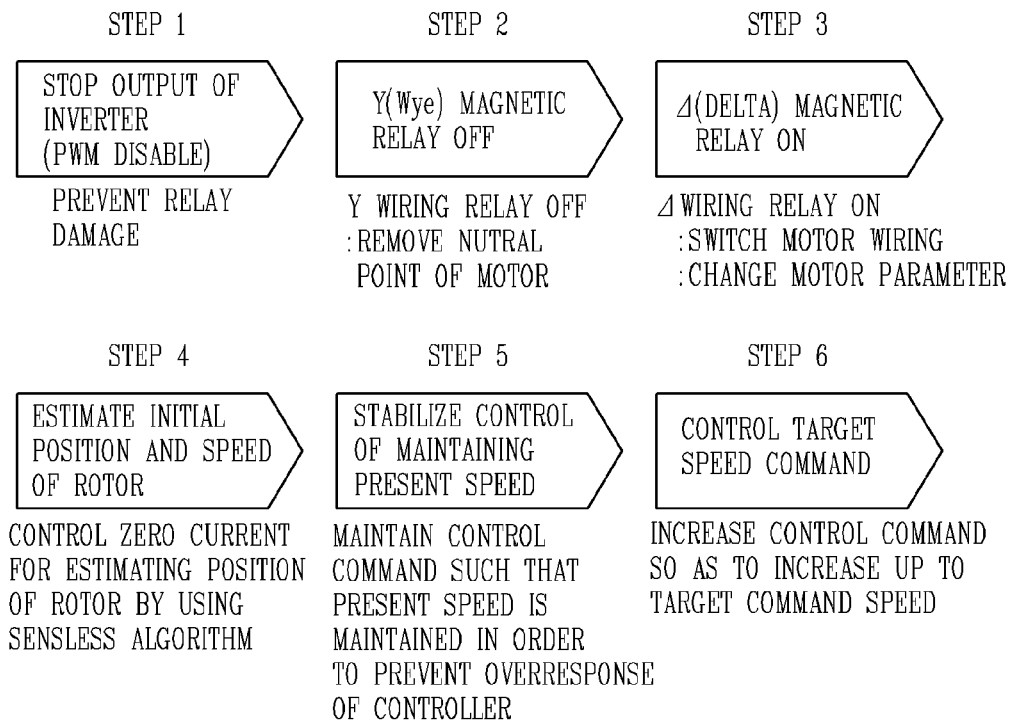
FIG. 2C is a flowchart illustrating each of the steps described in FIG. 2B divided into steps depending on time.

Meanwhile, (a) and (b) of FIG. 2C are flowcharts for illustrating each of the steps described in FIG. 2B.

First, in the case of the first step, the controller 100 may stop the PWM control to prevent damage of a relay circuit. In addition, in the second step, a neutral point of the motor 130 may be removed by turning off (low) a magnetic relay of the Y wiring. Further, in the third step, the magnetic relay of the Δ wiring may be turned on (high) to change the wiring of the motor 130.

Meanwhile, since it is a state in which the PWM control is stopped after the first step, the current command may be reduced to zero. In addition, it is a state in which the rotor of the motor 130 may be rotated according to inertia after the first step. In this case, the rotation speed of the rotor may be reduced gradually by the load torque.

Meanwhile, when the wiring of the motor 130 is switched, the controller 100 may estimate the position and speed of the rotor in the inertial rotation (fourth step). In addition, to prevent overresponse, a speed command may be applied such that the rotor maintains the present estimated speed. Accordingly, the current command may be applied (fifth step). Further, when the speed of the rotor is stabilized after the fifth step, the control command may be increased such that the rotation speed of the rotor is accelerated to a speed corresponding to a target command (sixth step). Meanwhile, FIG. 3 is a flowchart illustrating an example of a process of estimating an inertial rotation state of a motor rotor based on an inertial rotation model during an operation process of a compressor motor control apparatus 1 according to an embodiment of the present disclosure.

Figure 2C:
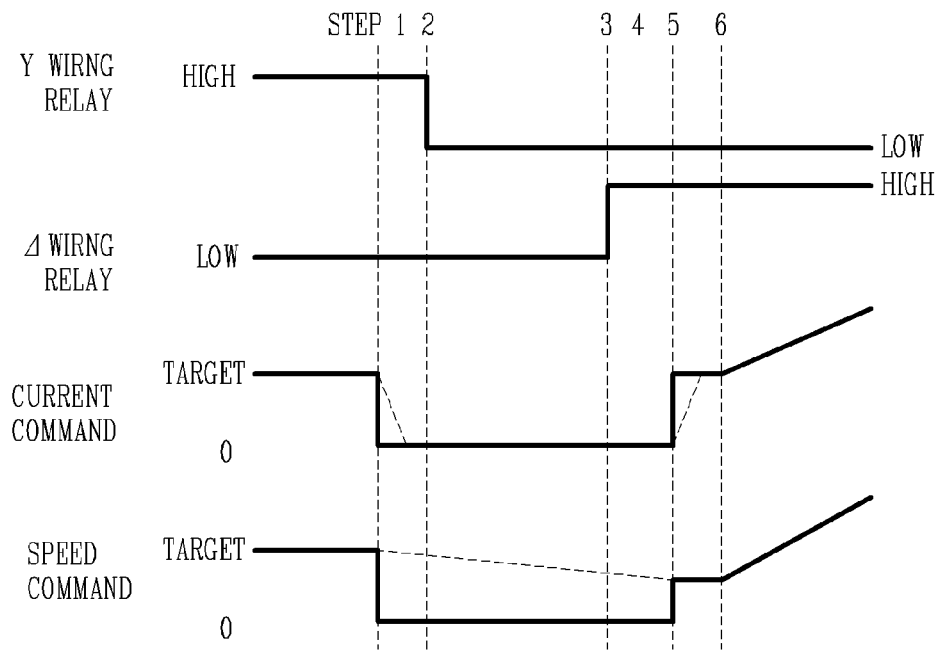
Figure 3:
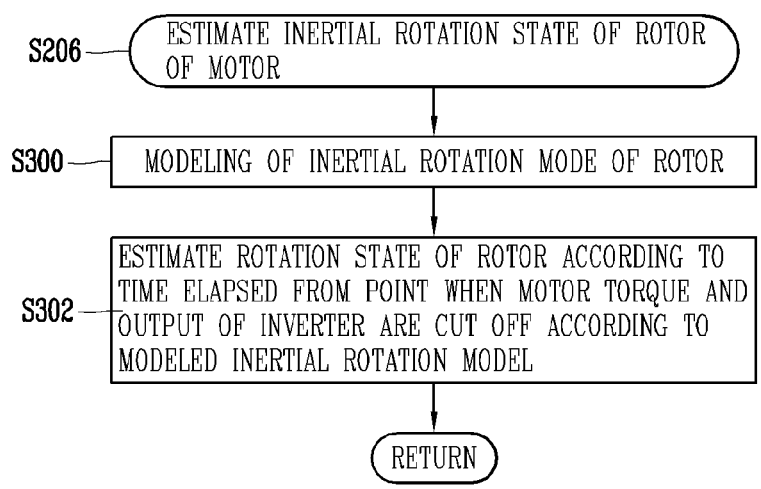
FIG. 3 is a flowchart illustrating an example of a process of estimating an inertia rotation state of a motor rotor during an operation process of a compressor motor control apparatus according to an embodiment of the present disclosure.

Referring to FIG. 3, when the output of the inverter and the motor torque applied to the motor 130 are cut off temporarily, as the switching of the wiring mode is performed in step S204 of FIG. 2, the controller 100 may model the inertial rotation state of the rotor in order to estimate the rotation state of the rotor in the inertial rotation state (S300). For example, the inertial rotation state of the rotor may be modeled as shown in following Equations 2 and 3.

$$T_e \xrightarrow{+} \bigcirc \xrightarrow{T_D} \boxed{\frac{1}{J_m S + B_M}} \to \omega_{rm} \quad \text{[Equation 2]}$$
$$\phantom{T_e}\;\; \uparrow T_L$$

$$T_e - T_L = J_m \frac{d\omega_{rm}}{dt} + B_m \omega_{rm} \to d\omega_{rm} = -T_L/J_m\, dt \quad \text{[Equation 3]}$$

Where, $T_e$ refers to an electric torque and a magnitude of a torque induced in a rotor, $T_L$ refers to a magnitude of a load torque, $T_D$ refers to a difference between the electric torque and the load torque, $J_m$ refers to inertia of the rotor, S refers to a Laplace constant, $B_m$ refers to a friction coefficient, and $\omega_{rm}$ refers to a rotor angular velocity.

Where, as described above, $T_e$ may be 0 since the output of the inverter is cut off and the rotor is rotated inertially. In addition, the friction coefficient $B_m$ may be considered as the load torque $T_L$ and assumed to be 0. Meanwhile, since the motor is a compressor driving motor, the load torque $T_L$ may be a compression load of the compressor.

Meanwhile, the controller 100 may estimate the rotation state of the rotor according to the time elapsed from the time point when the motor torque is cut off, that is, when the output of the inverter is cut off, according to the inertial rotation models shown in above Equations 2 and 3 (S302).

As an example, the controller 100 may calculate an angular velocity of the rotor according to the inertial rotation model, and estimate the calculated angular velocity as the rotation speed according to the inertial rotation of the rotor. In addition, when the motor 130 is a synchronous motor, the position of the N pole of the rotor may be further estimated based on the calculated angular velocity. Then, the controller 100 may proceed to step S208 of FIG. 2 again and set the estimated rotation speed of the rotor as the initial speed of the rotor. Further, when the motor 130 is a synchronous motor, the process of setting the estimated position of the N pole of the rotor as the initial position of the rotor may be further performed.

Meanwhile, the method shown in FIG. 3 illustrates an example of a method of estimating the rotation state of the rotor in the inertial rotation in the present disclosure. That is, of course, the method of estimating at least one of the rotation speed of the rotor in the inertial rotation and the position of the specific pole is not limited according to the method shown in FIG. 3 in the present disclosure, and in any case, in addition to the method shown in FIG. 3, at least one of the rotation speed of the rotor in the inertial rotation and the position of a specific pole may be estimated via various methods.

Meanwhile, the process of controlling the motor of which the wiring mode is switched in the step S210 may further include the process of reflecting a phase difference according to the characteristic of the wiring mode.

Figure 4A:
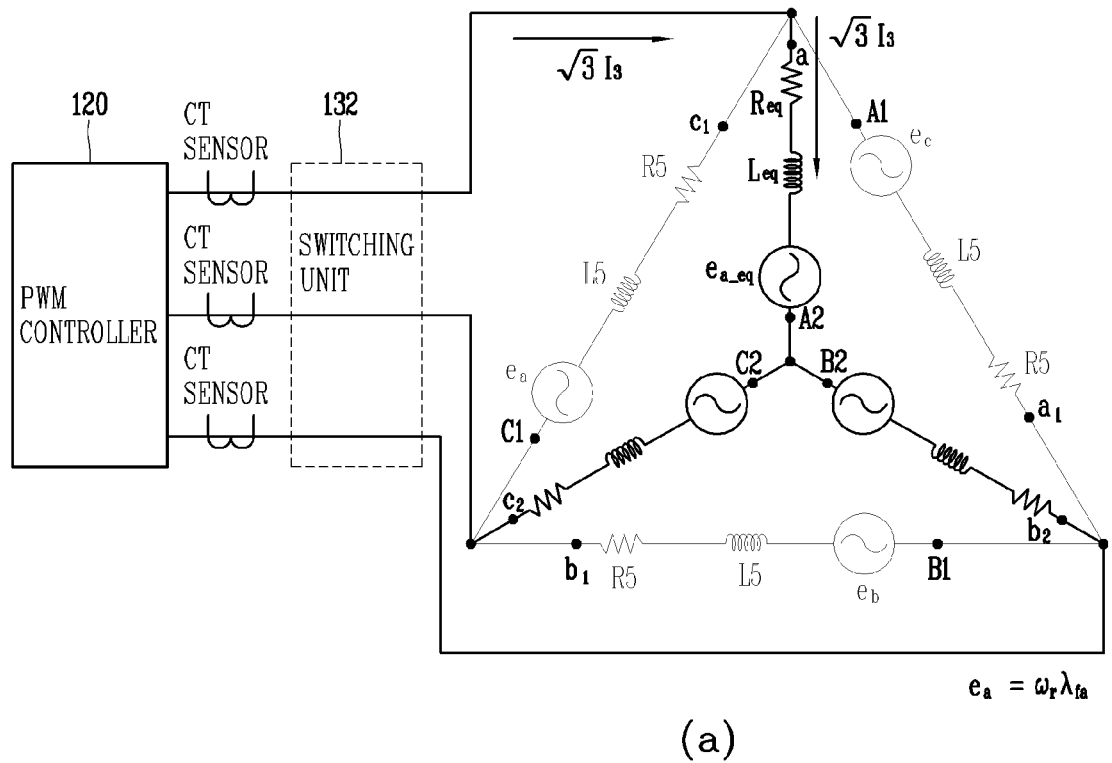
FIG. 4A is an illustrative view for illustrating an example of a wiring mode of a compressor motor according to an embodiment of the present disclosure.
Figure 4A:
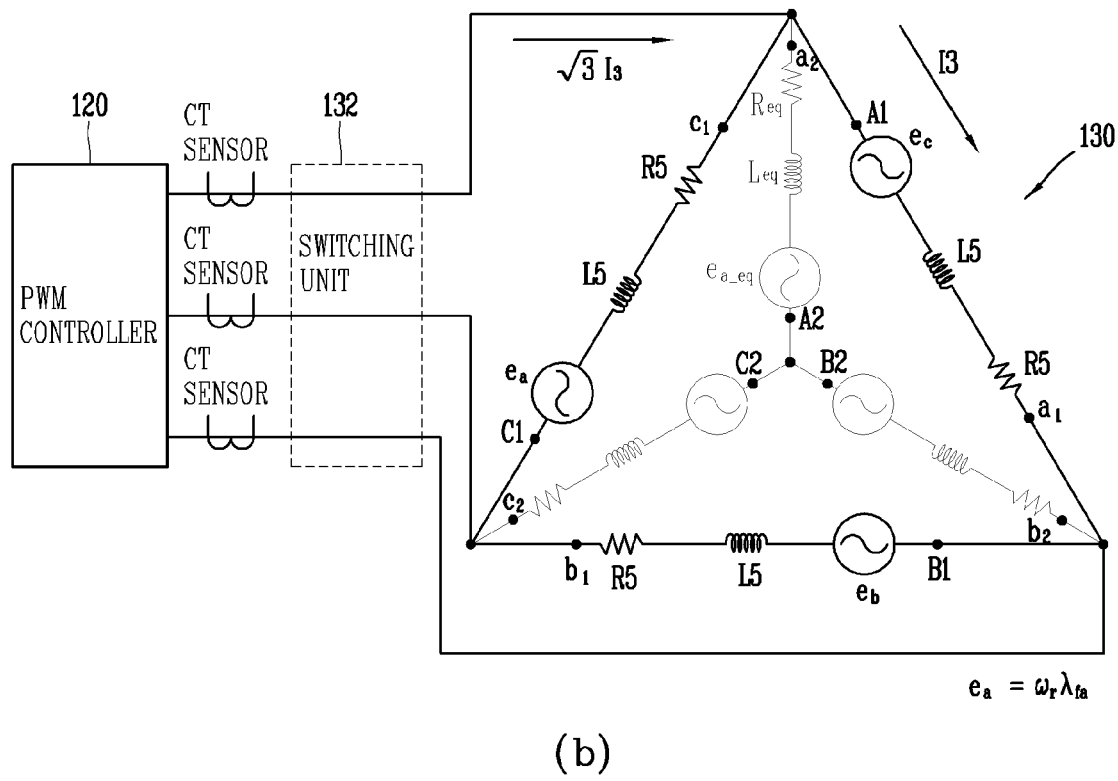

FIG. 4A is an illustrative view for illustrating an example of wiring modes of a compressor motor according to an embodiment of the present disclosure to explain such a phase difference.

Referring to FIG. 4A, (a) of FIG. 4A illustrates an example of a state in which windings are connected in a Δ wiring mode, and (b) of FIG. 4A illustrates an example of a state in which windings are connected in a Y wiring mode.

First, referring to (a) of FIG. 4A, when windings A2-$a_2$, B2-$b_2$, and C2-$c_2$ are connected in the Y wiring mode, since a current is applied to the windings A2-$a_2$, B2-$b_2$, and C2-$c_2$ forming a Y wiring structure, a current $\sqrt{3}I_3$ as an output current $\sqrt{3}I_3$ of the inverter is may be introduced. In this case, flux linkage, inductance, and winding resistance may be $\lambda_f$, $L_{d,q}$, and $R_s$, respectively.

On the other hand, referring to (b) of FIG. 4A, when windings A1-$a_1$, B1-$b_1$, and C1-$c_1$ are connected in the Δ wiring mode, since a current is introduced into the windings A1-$a_1$, B1-$b_1$, and C1-$c_1$ forming a Δ wiring structure, the direction in which the winding is connected to the Y wiring structure has a phase difference of 30 degrees. A current $I_3$ reduced to $1/\sqrt{3}$ with respect to the output current $\sqrt{3}I_3$ of the inverter may be introduced into the windings A1-$a_1$, B1-$b_1$, and C1-$c_1$ according to the phase difference. The flux linkage may be reduced to $1/\sqrt{3}$, and the inductance and winding resistance may be reduced to ⅓ respectively. The difference between the flux linkage, inductance, and winding resistance according to the structural difference of such a wiring mode is shown in Table 1 below.

TABLE 1

| Motor Connection | flux linkage ($\lambda_f$) | inductance ($L_{d,q}$) | winding resistance ($R_s$) |
| --- | --- | --- | --- |
| Y (Wye) | $\lambda_f$ | $L_{d,q}$ | $R_s$ |
| Δ (Delta) | $\lambda_f/\sqrt{3}$ | $L_{d,q}/3$ | $R_s/3$ |

Meanwhile, as described above, in the case of Δ wiring mode, since the phase difference of 30 degrees according to the structural characteristics of the windings connected occurs, when the Y wiring mode is switched to the Δ wiring mode, the controller 100 should change the position of the rotor by +30 degrees so that the controller 100 may perform accurate motor control according to the Δ wiring mode. On the other hand, when the Δ wiring mode is switched to the Y wiring mode, the position of the rotor should be changed by −30 degrees so that the accurate motor control according to the Y wiring mode may be performed. Therefore, the step S210 may further include the process of reflecting the phase difference according to the wiring mode switching and correcting the position of the rotor.

Figure 4B:
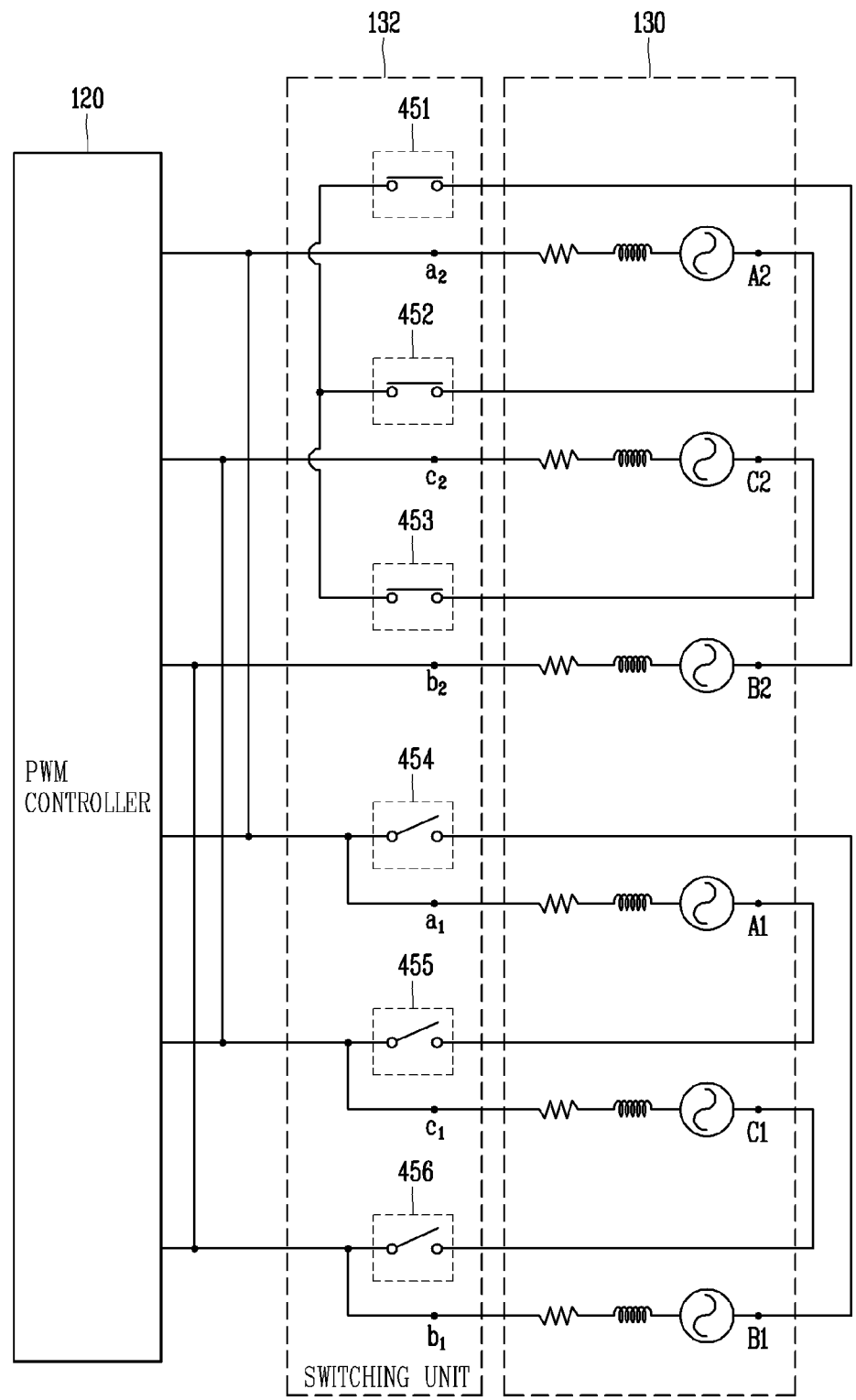
FIGS. 4B and 4C are illustrative views illustrating examples of a circuit configuration in which windings of a motor are connected differently according to a switching operation of a compressor motor according to an embodiment of the present disclosure.
Figure 4C:
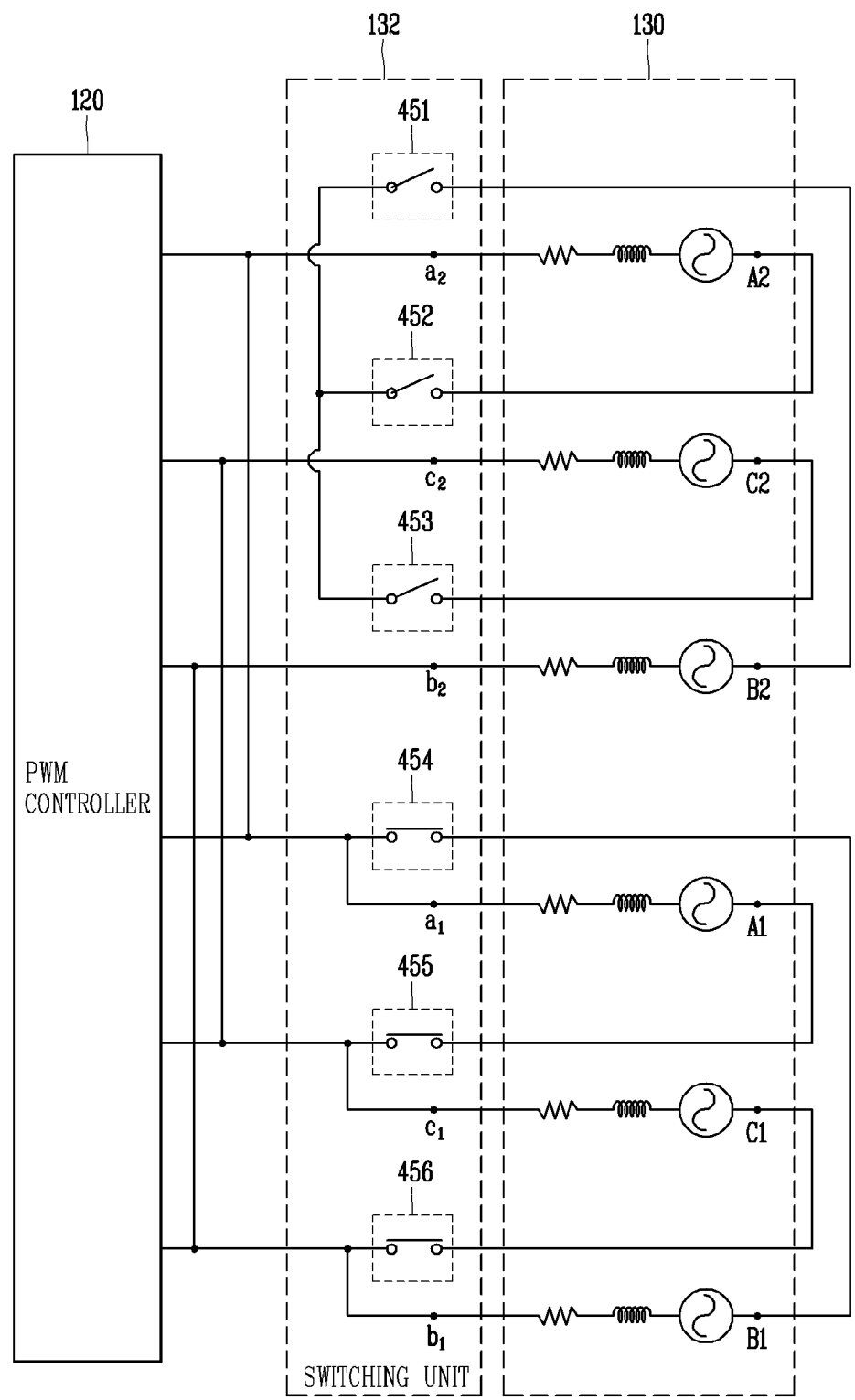

Meanwhile, FIGS. 4B and 4C illustrate circuit configurations in which the windings A1-$a_1$, B1-$b_1$, C1-$c_1$, A2-$a_2$, B2-$b_2$, and C2-$c_2$ of the motor 130 are differently connected according to the switching operation of the switching unit 132.

First, some windings (Y mode wirings: A2-$a_2$, B2-$b_2$, and C2-$c_2$) among the windings A1-$a_1$, B1-$b_1$, C1-$c_1$, A2-$a_2$, B2-$b_2$, and C2-$c_2$ of the motor 130 may be connected to first switches 451, 452, and 453 of the switching unit 132. In addition, some other windings (Δ mode windings A1-$a_1$, B1-$b_1$, and C1-$c_1$) may be connected to second switches 454, 455, and 456 of the switching unit 132. Meanwhile, the first switches and the second switches may operate complementarily. That is, when the first switches 451, 452 and 453 are turned on, the second switches 454, 455 and 456 may be turned off, and when the first switches 451, 452 and 453 are turned off, the second switches 454, 455 and 456 may be turned on.

First, referring to FIG. 4B in which the first switches 451, 452, and 453 are turned on, when the first switches 451, 452, and 453 are turned on, the Y mode wirings A2-$a_2$, B2-$b_2$, and C2-$c_2$ may be connected to each other. As shown in (a) of FIG. 4A, the Y mode wirings A2-$a_2$, B2-$b_2$, and C2-$c_2$ may be connected centering on the neutral point. In this case, the second switches 454, 455, and 456 may be turned off, and accordingly, the Δ mode wirings A1-$a_1$, B1-$b_1$, and C1-$c_1$ may not be connected, so that a circuit may not be formed.

On the other hand, referring to FIG. 4C in which the second switches 454, 455, and 456 are turned on, when the second switches 454, 455, and 456 are turned on, the Δ mode wirings A1-$a_1$, B1-$b_1$, and C1-$c_1$ may be connected to each other. Accordingly, as shown in (b) of FIG. 4A, the A mode wirings A2-$a_2$, B2-$b_2$, and C2-$c_2$ may be connected to each other. In this case, the first switches 451, 452, and 453 may be turned off, and accordingly, the Y mode wirings A2-$a_2$, B2-$b_2$, and C2-$c_2$ may not be connected, so that a circuit may not be formed.

Meanwhile, in the above description, the rotation state of the rotor in the inertial rotation state according to the switching of the wiring mode of the motor 130 is estimated, the initial value of the rotor according to the estimated rotation state is set, and the initial value of the set rotor is set, so that an operation process for allowing motor control according to the switched wiring mode to be performed before the rotation of the rotor is stopped has been described in detail with reference to flowcharts.

In the following description, a wiring mode switching time between a compressor motor control apparatus 1 according to an embodiment of the present disclosure and a conventional motor control apparatus 1 will be compared via illustrative views, and the pressure of the compressor consumed according to the compressor motor control method according to an embodiment of the present disclosure will be described.

Figure 5:
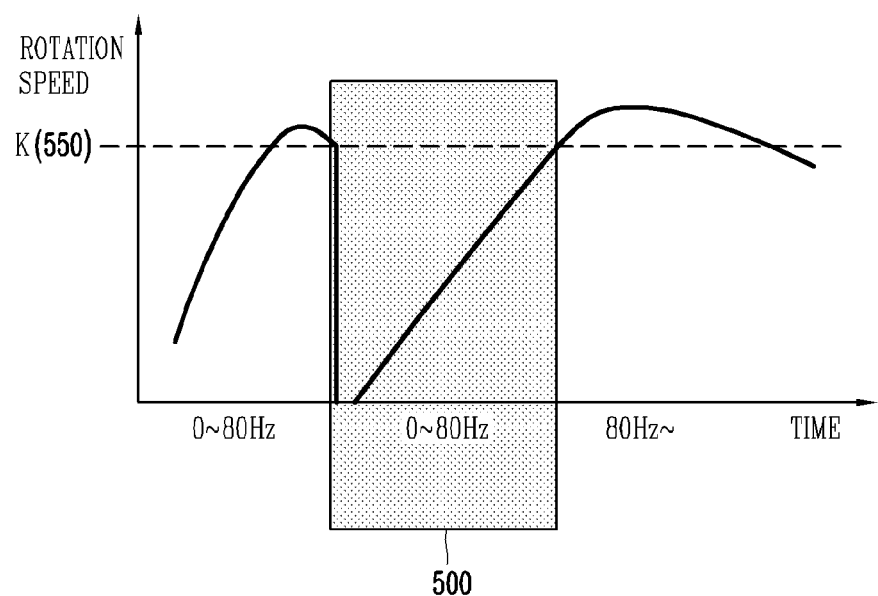
FIG. 5 is an illustrative view for illustrating a difference between a switching time at the time of switching a wiring mode in a typical case and a switching time at the time of switching a wiring mode according to an embodiment of the present disclosure.
Figure 5:
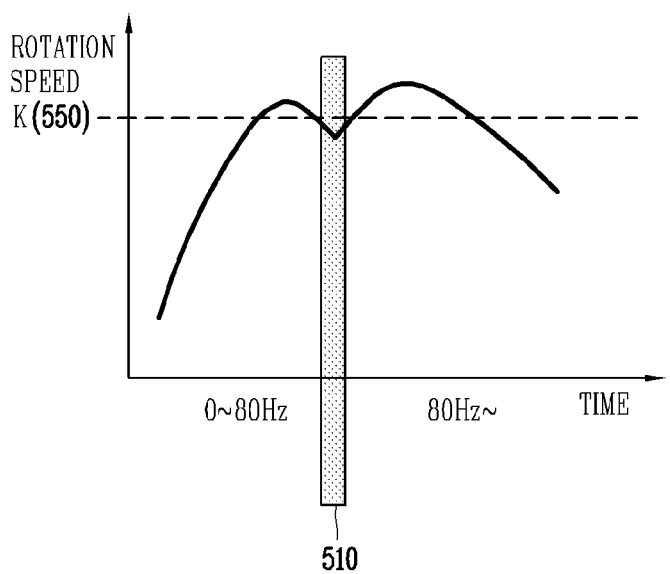

FIG. 5 is illustrative views for illustrating examples of a switching time at the time of switching a wiring mode in a typical case and a switching time at the time of switching a wiring mode according to an embodiment of the present disclosure. Meanwhile, in the following description, the wiring mode before the switching is performed will be referred to as the first wiring mode and the wiring mode after the switching is performed will be referred to as the second wiring mode.

First, referring to (a) of FIG. 5, (a) of FIG. 5 illustrates an example in which switching of a wiring mode in a conventional compressor motor control apparatus is performed. In the case of the conventional compressor motor control apparatus, when the output of an inverter and the output of a motor torque are cut off at the timing of switching the wiring mode, as shown in (a) of FIG. 5, it can be seen that control according to the second wiring mode is performed after the rotation of the rotor according to the first wiring mode is completely stopped.

Accordingly, as shown in (a) of FIG. 5, it can be seen that considerable time is required to reach rotation speed (K) 550 of the motor (rotor) at the time when switching is performed. That is, when it is determined that the switching is completed in the case of reaching the rotation speed (K) 550 at the time when the switching is performed, the conventional compressor motor control apparatus has a problem that the time required for switching, that is, a switching time 500 is long.

On the other hand, (b) of FIG. 5 shows an example in which switching of a wiring mode is performed in the compressor motor control apparatus 1 according to an embodiment of the present disclosure. In the case of the compressor motor control apparatus 1 according to an embodiment of the present disclosure, when the output of the inverter and the output of the motor torque are cut off at the timing of switching the wiring mode, as shown in (b) of FIG. 5, it can be seen that the control according to the second wiring mode is performed in a state in which the rotor is rotating inertially.

Accordingly, as shown in (b) of FIG. 5, it can be seen that the time required for reaching the rotation speed (K) 550 of the motor (rotor) at the time when switching is performed is shorter than that of the conventional motor control apparatus. That is, when it is determined that the switching is completed in the case of reaching the rotation speed (K) 550 at the time when the switching is performed, the compressor motor control apparatus 1 according to an embodiment of the present disclosure may reduce the time required for switching, that is, the switching time 510 significantly, and thus the present disclosure has an effect that the wiring mode can be switched at a high speed.

Meanwhile, as shown in (a) of FIG. 5, the conventional compressor motor control method controls the rotation of the rotor such that the rotation of the rotor is rotated again at a designated speed after the rotation of the rotor is stopped completely. Therefore, there is a problem in that a loss of the compressor pressure occurs due to the stop of the rotor, and the power from the stopped state is to a constant speed of the rotor is wasted.

Figure 6:
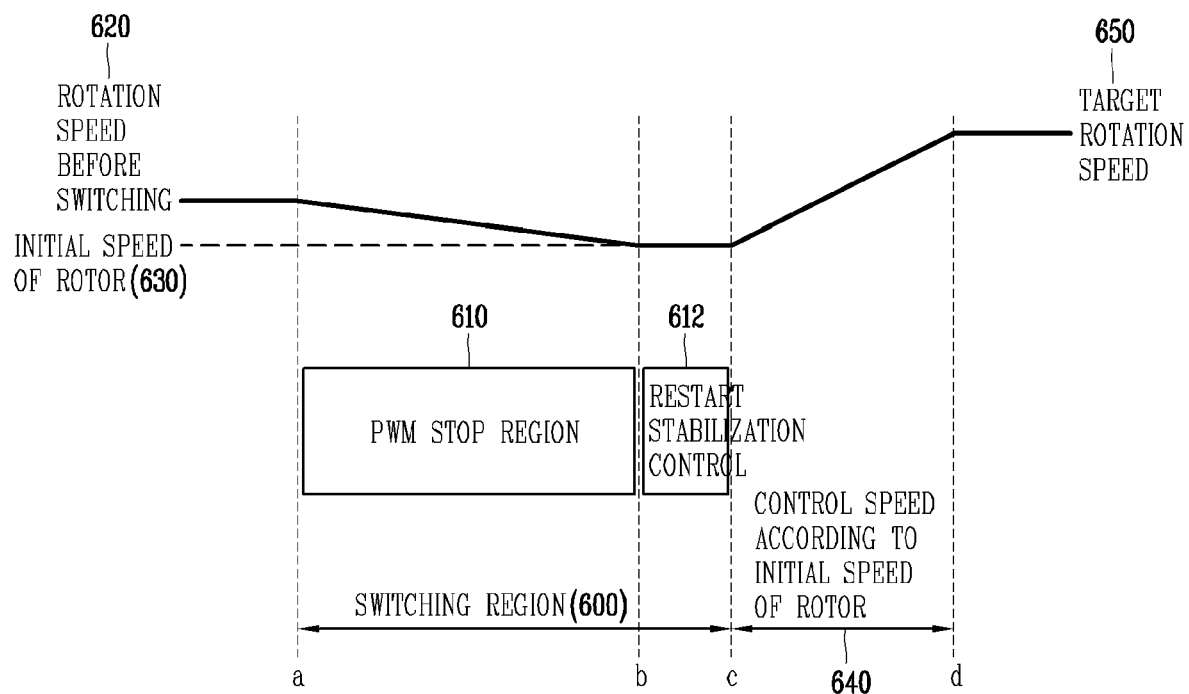
FIG. 6 is a conceptual diagram illustrating an example of a rotation speed of a motor according to elapse of time when the wiring mode is switched according to an embodiment of the present disclosure.

On the other hand, in the present disclosure, as shown in (b) of FIG. 5, a control according to the second wiring mode may be performed in a state in which the rotor is inertially rotated. Therefore, the loss of pressure may also be reduced greatly, and the power consumption may also be reduced by setting the rotation speed of the rotor in the inertial rotation state as the initial value and controlling the drive of the motor according to a difference between the target rotation speed and the initial value. FIG. 6 is a conceptual diagram illustrating an example of a rotation speed of a motor according to elapse of time when the wiring mode is switched as described above according to an embodiment of the present disclosure.

Referring to FIG. 6, when the motor is driven in the Y wiring mode, when the speed command frequency changed at a time point a is greater than the switching boundary frequency, the controller 100 may perform the switching of the wiring mode. Accordingly, the output of the inverter and the motor torque at the time a may be cut off. Therefore, it can be seen that the rotor of the motor 130 at the time point a may be in an inertial rotation state, and the rotation speed of the rotor decreases by the decreasing moment of inertia.

Meanwhile, the controller 100 may estimate the rotation state of the rotor in the inertial rotation during a time 610 when the output of the inverter and the motor torque are cut off by the switching, that is, when the PWM control is stopped. As an example, the estimated rotation state may include the rotation speed of the rotor and the position of the rotor (the position of the N pole).

In addition, when the switching of the wiring mode of the motor 130 is completed, the controller 100 may control the rotation of the rotor according to the is switched wiring mode before the inertially rotating rotor is stopped. That is, for example, when the Y wiring mode is switched to the Δ wiring mode, the controller 100 may accelerate the rotation speed of the rotor to the rotation speed according to the target command. On the other hand, when the Δ wiring mode is switched to the Y wiring mode, the rotation speed of the rotor may be decelerated to the rotation speed according to the target command.

In this case, the controller 100 may set an initial value of the rotor based on the estimated speed and position of the rotor and accelerate or decelerate the rotor based on the set initial value. In this case, the initial value of the rotor may be an initial value for controlling the rotor according to the currently completely switched wiring mode.

That is, the controller 100 may generate a speed command for controlling the rotation of the rotor based on the estimated position and speed of the rotor in the inertial rotation. In this case, the controller 100 may control the rotation of the rotor based on the present position (N pole) of the rotor and accelerate or decelerate the rotation speed of the rotor from the rotation speed of the rotor corresponding to the initial value to the rotation speed corresponding to the target command. As an example, the controller 100 may calculate a difference between the rotation speed corresponding to the target command and the rotation speed of the rotor set as the initial value, that is, the currently estimated rotation speed of the rotor in the inertial rotation state, and decelerate or accelerate the rotation speed of the rotor according to the calculated speed difference.

In this case, the controller 100 may correct the position of the rotor according to the phase difference (30 degrees) according to the switching of the wiring mode.

Meanwhile, when driving according to the switched wiring mode is started at a time point b, the controller 100 may perform the motor control 612 for the stabilization of restart for a predetermined time. The restart stabilization control period 612 may be a period of maintaining the rotation speed according to the currently set initial value of the motor 130. In addition, when the restart stabilization control period is completed, based on the initial speed of the rotor until the speed of the rotor reaches the speed corresponding to the speed of the changed speed command frequency 640, the rotor may be accelerated (when Y wiring mode is switched to Δ wiring mode) or decelerated (when Δ wiring mode is switched to Y wiring mode). In addition, when the rotation speed of the rotor reaches the rotation speed according to the changed speed command frequency, that is, the target rotation speed 650, the current motor control state may be maintained.

Meanwhile, in the case of the present disclosure, as shown in FIG. 6, the initial speed 630 of the rotor is set based on the rotation state of the rotor in the inertial rotation, so that the rotation speed of the rotor from the set initial speed to the rotation speed corresponding to the target command may be accelerated or decelerated. Therefore, in the present disclosure, the pressure of the compressor may be lost only during inertially rotating after the PWM control is stopped. That is, the pressure of the compressor is lost only during the time when the rotation speed of the rotor decreases from the rotation speed 620 to the initial speed 630 of the rotor before switching. This is because, when the initial speed and the initial position are estimated from the inertially rotating rotor, the rotation speed control of the rotor is performed according to the wiring mode switched based on the estimated initial speed and initial position. Therefore, the loss of the compressor pressure due to the switching of the motor wiring mode may be minimized.

In addition, the rotor may be accelerated or decelerated only from the initial speed 630 of the rotor to the target rotation speed 650. Therefore, the time for reaching the rotation speed of the motor (rotor) to the target rotation speed 650 may be shortened, thereby avoiding waste of power according thereto.

Effects of the compressor motor control apparatus and the control method of the apparatus according to the present disclosure will be described below.

According to at least one of the embodiments of the present disclosure, when the wiring mode of the motor is switched at the timing of driving the compressor motor, while the rotor of the motor is rotating by the moment of inertia, the initial value of the rotor according to the wiring mode to be switched according to the rotation state of the rotor is set and the rotation of the rotor is controlled according to the set initial value, and thus the present disclosure has an effect that the wiring mode of the motor can be switched at a higher speed.

In addition, according to at least one of the embodiments of the present disclosure, while the rotor of the motor rotates inertially, the wiring mode of the motor is switched and the time for which PWM control is stopped is reduced, and thus the present disclosure has an effect that the pressure of the compressor lost at the timing of switching the motor wiring can be minimized.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. The above detailed description should not be limitedly construed in all aspects and should be considered as illustrative. Therefore, all changes and modifications that fall within the metes and bounds of the claims, or equivalents of such metes and bounds are therefore intended to be embraced by the appended claims.

What is claimed is:

1. A compressor motor control apparatus, comprising:
    a motor comprising a rotor being configured to rotate according to a motor torque that is controlled by a pulse width modulation (PWM) control;
    a switching unit provided at the motor, the switching unit being configured to switch a wiring mode inside the motor so that the motor is driven from a first wiring mode to a second wiring mode; and
    a controller configured to generate a speed command frequency for controlling a rotation speed of the rotor, and control the switching unit so that the wiring mode of the motor is switched according to a comparison of the speed command frequency with a switching boundary frequency according to the wiring mode of the motor,
    wherein when the PWM control is stopped in response to the switching of the wiring mode, the controller determines a rotation state of the rotor that rotates inertially, and when the PWM control is restarted, the controller sets the determined rotation state of the rotor as an initial value of the rotor and controls a rotation speed of the motor of which the wiring mode is switched based on the set initial value of the rotor.

2. The apparatus of claim 1,
    wherein when the PWM control is restarted, the controller reflects a phase difference between the first and second wiring modes and compensates a position of the rotor.

3. The apparatus of claim 2,
    wherein the position of the rotor to be compensated is +30 degrees or −30 degrees.

4. The apparatus of claim 1,
    wherein when the initial value of the rotor is set, the controller controls the rotation speed of the motor of which the wiring mode is switched according to the speed command frequency after maintaining the rotation state of the rotor according to the set initial value of the rotor for a predetermined time.

5. The apparatus of claim 1,
    wherein when the PWM control is stopped according to the switching of the wiring mode, the controller generates an inertial rotation model of the rotor and determines a rotation state of the rotor based on an angular velocity calculated according to the inertial rotation model and a predetermined time elapsed after the PWM control is stopped.

6. The apparatus of claim 1,
    wherein the controller applies a zero voltage vector to an inverter applying alternating current (AC) to the motor, and determines a rotation state of the rotor during inertial rotation based on a difference in current induced in the rotor.

7. The apparatus of claim 1,
    wherein the controller determines at least one of the rotation speed of the rotor in an inertial rotation state and the position of a specific pole (N) of the rotor according to the PWM control stop as the rotation state of the rotor.

8. The apparatus of claim 7,
    wherein when the motor is a synchronous motor in which a rotation magnetic field and a rotation of the rotor are synchronized, the controller being configured to synchronize the rotation magnetic field and the rotation of the rotor based on the determined position of the specific pole (N).

9. The apparatus of claim 1,
    wherein the motor is driven in a Y wiring mode or Δ(delta) wiring mode according to the wiring mode,
    when a present wiring mode of the motor is the Y wiring mode, the controller switches to the Δ wiring mode when the speed command frequency is greater than a first switching boundary frequency, and
    when the present wiring mode of the motor is the Δ wiring mode, the controller switches to the Y wiring mode when the speed command frequency is less than a second switching boundary frequency,
    whereby the first wiring mode is the Y wiring mode and the second wiring mode is the Δ wiring mode, or vice-versa.

10. The apparatus of claim 9,
    wherein the first switching boundary frequency has the same speed command frequency as the second switching boundary frequency.

11. The apparatus of claim 9,
    wherein when the switching to the Δ wiring mode is performed, the controller controls the motor such that the rotor accelerates by a difference between the rotation speed according to the speed command frequency and the rotation speed of the rotor according to the initial value, and when the switching to the Y wiring mode is performed, the controller controls the motor such that the rotor decelerates by a difference between the rotation speed according to the speed command frequency and the rotation speed of the rotor according to the initial value.

12. The apparatus of claim 1, wherein the switching boundary frequency is a speed command frequency corresponding to the rotation speed of the rotor when a first combined efficiency determined depending on efficiency of the motor according to the first wiring mode is the same as a second combined efficiency determined depending on efficiency of the motor according to the second wiring mode.

13. The apparatus of claim 12, wherein the controller generates a hysteresis bandwidth around the switching boundary frequency, and switches the wiring mode of the motor when the changed speed command frequency deviates from the hysteresis bandwidth.

14. The apparatus of claim 13, wherein when the changed speed command frequency exceeds 110% of the switching boundary frequency, the controller switches the wiring mode of the motor from the first wiring mode to the second wiring mode, and when the changed speed command frequency is less than 90% of the switching boundary frequency, the controller switches the wiring mode of the motor from the second wiring mode to the first wiring mode.

15. The apparatus of claim 1, wherein the controller determines a rotation state of the rotor that rotates inertially based on an inertial rotation state modeled according to following Equation:

$$T_e - T_L = J_m \frac{d\omega_{rm}}{dt} + B_m \omega_{rm} \rightarrow d\omega_{rm} = -T_L / J_m \, dt$$

where, $T_e$ refers to an electric torque and a magnitude of a torque induced in a rotor, $T_L$ refers to a magnitude of a load torque, $T_D$ refers to a difference between the electric torque and the load torque, $J_m$ refers to inertia of the rotor, S refers to a Laplace constant, $B_m$ refers to a friction coefficient, and $\omega_{rm}$ refers to a rotor angular velocity.

16. A control method of a compressor motor, the method comprising:
a first step of detecting, by a controller, a wiring mode of the motor when a speed command frequency for controlling a rotation speed of a rotor of the motor is changed;
a second step of comparing, by the controller, a predetermined switching boundary frequency according to the wiring mode with the changed speed command frequency;
a third step of stopping a pulse width modulation (PWM) control according to the comparison result and then switching the wiring mode of the motor;
a fourth step of determining, by the controller, the rotation speed of the rotor while the PWM control is stopped;
a fifth step of setting, by the controller, an initial value of the rotor based on the determined rotation speed when the PWM control is restarted; and
a sixth step of controlling, by the controller, rotation of the motor of which the wiring mode is switched according to the predetermined initial value and a rotation speed difference according to the changed speed command frequency.

17. The method of claim 16, wherein the fifth step further comprises reflecting a phase difference according to the wiring mode of the switched motor and compensating for the position of the rotor when the PWM control is restarted.

18. The method of claim 17, wherein the position of the rotor to be compensated is +30 degrees or −30 degrees.

19. The method of claim 16, wherein the fourth step further comprises determining a position of a specific pole of the rotor.

20. The method of claim 16, wherein the switching boundary frequency is a speed command frequency corresponding to the rotation speed of the rotor when a first combined efficiency determined depending on efficiency of the motor according to a first wiring mode is the same as a second combined efficiency determined depending on efficiency of the motor according to a second wiring mode.

* * * * *